US010614266B2

(12) United States Patent
Dakin et al.

(10) Patent No.: US 10,614,266 B2
(45) Date of Patent: *Apr. 7, 2020

(54) RECOGNITION AND POPULATION OF FORM FIELDS IN AN ELECTRONIC DOCUMENT

(71) Applicant: Adobe Inc., San Jose, CA (US)

(72) Inventors: Steve Dakin, San Jose, CA (US); Shawn Gaither, Raleigh, NC (US); Randy Swineford, Sunnyvale, CA (US); Frederic Thevenet, San Francisco, CA (US); David Rudi Sherry, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/250,523

(22) Filed: Jan. 17, 2019

(65) Prior Publication Data

US 2019/0155892 A1      May 23, 2019

Related U.S. Application Data

(63) Continuation of application No. 14/605,475, filed on Jan. 26, 2015, now Pat. No. 10,223,344.

(51) Int. Cl.
*G06F 17/00* (2019.01)
*G06F 40/174* (2020.01)
*G06F 40/274* (2020.01)

(52) U.S. Cl.
CPC .......... *G06F 40/174* (2020.01); *G06F 40/274* (2020.01)

(58) Field of Classification Search
CPC ............................. G06F 40/274; G06F 40/174
See application file for complete search history.

(56) References Cited

U.S. PATENT DOCUMENTS

| 7,203,699 | B2 | 4/2007 | Bellamy |
| 7,996,589 | B2 | 8/2011 | Schultz et al. |
| 8,095,476 | B2 | 1/2012 | Bierner et al. |
| 2002/0095406 | A1 | 7/2002 | McGeorge, Jr. |
| 2006/0007189 | A1 | 1/2006 | Gaines, III et al. |
| 2006/0161646 | A1 | 7/2006 | Chene et al. |
| 2006/0200754 | A1 | 9/2006 | Kablesh et al. |
| 2007/0112599 | A1 | 5/2007 | Liu et al. |
| 2008/0235567 | A1 | 9/2008 | Raj et al. |

(Continued)

*Primary Examiner* — Mohammed H Zuberi
(74) *Attorney, Agent, or Firm* — Finch & Maloney PLLC (57) ABSTRACT

Techniques are disclosed for identifying and populating static form fields using prior responses to similar form fields. An example method includes receiving an electronic form having, encoded in the form, static text and a static form field for containing information specific to a given user of the electronic form. Using an image recognition algorithm, a fillable form field candidate is identified based on a graphical representation of the static form field. An attribute of the fillable form field candidate can be identified based on the static text. A suggested response for populating the fillable form field candidate is selected from prior responses to other form fields having at least one attribute in common with the identified attribute of the fillable form field candidate. The prior responses are inputs obtained from or associated with the given user. The suggested response is presented to the user for subsequent acceptance or rejection.

20 Claims, 8 Drawing Sheets

(56) References Cited

U.S. PATENT DOCUMENTS

| | | |
|---|---|---|
| 2009/0204881 A1 | 8/2009 | Murthy et al. |
| 2010/0211863 A1 | 8/2010 | Jones et al. |
| 2011/0231409 A1 | 9/2011 | Dhara et al. |
| 2011/0271173 A1 | 11/2011 | Ait-Mokhtar et al. |
| 2014/0129914 A1 | 5/2014 | Agarwal |
| 2016/0253303 A1* | 9/2016 | Pennington ........... G06F 17/243 715/226 |

* cited by examiner

FIG. 1

Ticket Order Form

First Name
Jack

Last Name
Smith

Street Address
123 Second St

City
Greenwich

State
NY

ZIP Code
12345

Telephone
(123) 456-7890

Payment

Check ☐    Credit Card ☑

Credit Card Number
9876 5432 1012 345

Signature

FIG. 2

Ticket Order Form

First Name: Jack

Last Name: Smith

Street Address: 123 Second St

City: Greenwich

State: NY

ZIP Code: 12345

Telephone: (123) 456-7890

Payment

- Check ☐
- Credit Card ☑

Credit Card Number: 9876 5432 1012 345

Signature: ____________________

FIG. 3

Form Field Response Database

```
User ID: 75614040971342

Field_1_Label: "First Name"
Field_1_Type: Text
Field_1_Value_1: "Jack"

Field_2_Label: "Last Name"
Field_2_Type: Text
Field_2_Value_1: "Smith"

Field_3_Label: "Street Address"
Field_3_Type: Text
Field_3_Value_1: "123 Second St"

Field_4_Label: "City"
Field_4_Type: Text
Field_4_Value_1: "Greenwich"

Field_5_Label: "State"
Field_5_Type: Text
Field_5_Value_1: "NY"

Field_6_Label: "ZIP Code"
Field_6_Type: Text
Field_6_Value_1: "12345"

Field_7_Label: "Telephone"
Field_7_Type: Text
Field_7_Value_1: "(123)456-7890"

Field_8_Label: "Check"
Field_8_Type: Checkbox
Field_8_Value_1: False

Field_9_Label: "Credit Card"
Field_9_Type: Checkbox
Field_9_Value_1: True

Field_10_Label: "Credit Card Number"
Field_10_Type: Text
Field_10_Value_1: "9876 5432 1012 345"
```

FIG. 4

Tax ID Form

Jack — 510
First Name

Smith — 512
Last Name

123 Second St — 514
Street

Greenwich — 516
City

NY — 518
State

Street Address
123 Second St

12345 — 520
ZIP (123) 456-7890 — 522
Telephone

____ — 524
Tax ID

FIG. 5

Tax ID Form

Jack — 510
First Name

Smith — 512
Last Name — 514

123 Second St
Street

Greenwich — 516
City

NY — 518
State

12345 — 520
ZIP

43| — 522
Telephone

— 524
Tax ID

RECOGNITION AND POPULATION OF FORM FIELDS IN AN ELECTRONIC DOCUMENT

CROSS REFERENCE TO RELATED APPLICATIONS

This application is a continuation of U.S. patent application Ser. No. 14/605,475 (filed 26 Jan. 2015), the entire disclosure of which is hereby incorporated by reference herein.

FIELD OF THE DISCLOSURE

This disclosure relates to the field of data processing, and more particularly, to techniques for recognizing form fields in an electronic form and presenting relevant data suggestions, including the option to automatically populate the form fields with data.

BACKGROUND

A form is a document with fields or spaces into which a person can enter data or select a pre-defined data value from a list. Some existing electronic forms, such as those in Portable Document Format (PDF), include so-called live form fields, which are defined data entry fields built into the form. For example, the electronic form may contain live form fields for typing in a first and last name, street address, telephone number, or other types of information that the user enters into the form. The electronic form may additionally or alternatively contain live form fields for selecting, via a user interface (e.g., a drop-down menu), defined data values from a list without having to manually type those values in. Examples of such defined data values include a list of titles (Mr., Ms., Mrs., etc.), states (CA, IL, NY, etc.), and years (2014, 2015, 2016, etc.). Because live form fields are defined within the electronic form, a computer configured to process the form can, using some existing techniques, automatically suggest data that is appropriate for the field. For example, a form with fields for first and last name may be automatically filled with the user's first and last names, which are stored in a database from previous user interactions with forms having similar fields. Automatic form filling reduces the burden on the user to manually enter the same data repeatedly on different forms. However, these existing techniques require the form to contain explicit definitions of each form field so that the computer can suggest appropriate input data based on form field attributes and user information or prior field values. Additionally, some such existing techniques must match the explicit definitions to previous forms or data. Further, cooperation between different form vendors and the application is needed when such forms come from different types of documents or different vendors. Therefore, such existing form filling techniques cannot be used with electronic forms having undefined form fields or where the form field definitions are not consistent between different forms. Thus, there is a need for improved techniques for recognizing the presence of form fields in an electronic form and for populating those form fields with appropriate data.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

To aid in suggesting data for filling in electronic form fields, some existing form filling techniques maintain lists of user inputs gathered from prior form filling sessions. When a user opens an electronic form, these existing techniques provide suggestions for filling so-called live form fields that are defined in the form. For instance, if a form contains a live form field defined as "e-mail address," the data entered into that field is stored in a database. When the user opens another form with a similar live form field, the application may suggest the same e-mail address that was previously entered by the user on the first form. These live form fields are generally defined by an administrator of the electronic form. However, not all forms have pre-defined live form fields. For example, a hardcopy form that is digitally scanned and converted into a PDF file will not have any defined live form fields; such a form is referred to as a so-called flat form. Flat forms include static form fields, which are fields that are not defined as being fillable. Consequently, some existing techniques cannot suggest data for filling the fields of the flat form.

To this end, and in accordance with an embodiment of the present invention, techniques are disclosed for automatically identifying and filling the fields of a form with data values that are associated with a particular user. In cases where the form does not have pre-defined form fields (e.g., a flat form where the contents include text, graphic lines, images, or any combination of these), fillable form fields candidates are identified using pattern and text recognition. Once the fillable form field candidates are identified, one or more suggested responses are presented to the user via a graphical user interface for filling in the fillable form field candidate when the user selects the fillable form field candidate (e.g., using a mouse or the tab key). The suggested responses are based on prior responses by the same user, or other contextual user information (e.g., the first and last name associated with a current login), to similar form fields in other forms. The user can then select one of the suggested responses to fill the selected form field, or manually enter data into the selected form field. Additionally or alternatively, a suggested response can be automatically entered into a form field without additional user intervention when the fillable form field candidate is selected by the user. In the case where the user does not accept the suggested response, the list of alternative suggested responses, if any, can be displayed to provide alternative responses for the user to choose from. Numerous configurations and variations will be apparent in light of this disclosure.

For example, in addition to providing a list of alternative suggested responses that are based on the identity of a fillable form field, the list of alternative suggested responses can be automatically modified or culled as the user types one or more letters to match either the start or a portion of alternative suggested responses in the list. Note that these alternatives can include literal matches and, if the number of suggested alternatives does not meet a minimum pre-defined number of choices, the alternatives may include any prior responses matching the pattern of typed letters using certain criteria (e.g., recency or popularity).

As used in this disclosure, the term "electronic form" refers to a document that retains the appearance of a paper-based form while allowing data to be entered into the form using a computer. Some examples of an electronic form include render-based file formats, such as a Portable Document Format or PDF document, and a Microsoft Word or Excel document. Other examples of an electronic form include image-based file formats, such as PNG, TIF, GIF, JPG, and BMP. In the case of image-based formats, because text is not rendered and is only distinguished visually, optical character recognition (OCR) technology may be used along with pre-processing to detect lines and other graphic patterns. Once the text and graphic elements are obtained from the image pre-processing, the electronic form can be processed in a similar manner to a render-based format, such as PDF, Word, Excel, or other suitable format.

As used in this disclosure, the term "form field" refers to a region of an electronic form where data can be entered by a user. A form field can include a region for entering text, values, or other markings, such as a digitized handwritten signature in a signature block, a checkmark in a check box, or a bullet symbol in a radio button.

As used in this disclosure, the term "suggested response" refers to data that is automatically provided or otherwise suggested to a user for filling a form field of an electronic form. A suggested response can include text, numbers, symbols, colors, markings or other visual elements that are suitable for entry into a given form field. A user can be given the ability to accept or reject the entry of the suggested response into the form field, and may be given the ability to substitute the suggested response for a different response of the user's choosing. A suggested response can, in some cases, include a list of several responses from which the user is given the ability to select or reject one or more of those responses for entry into the form field. In some other cases, certain form fields may include the ability to add a mark on the page to select and indicate a binary value (e.g., check boxes, radio buttons, underlining or encircling the desired text). In these cases, no suggested response will necessarily be presented; however, the user can use the Tab key to tab to the next possible mark and then press another key (e.g., arrow, space, enter) to turn that mark on or off, which further reduces user interaction with the form. In the case of radio buttons that are grouped together, where only one radio button within the group may be selected (e.g., a group including "Male" and "Female" radio buttons), the currently selected radio button may be unchecked when another radio button in the same group is selected. The user interface may, in some cases, accept the Shift Key in addition to the key defined to make the mark (e.g., arrow, space or enter key) for unselecting the currently selected radio button in a single step.

In particular, a method is disclosed for identifying and presenting relevant data suggestions, including the option to automatically populate static form fields using prior responses to similar form fields. According to an embodiment of the present invention, the method includes receiving an electronic form having, encoded in the form, static text and a static form field for containing information specific to a given user of the electronic form. Using an image recognition algorithm, a fillable form field candidate is identified based on a graphical representation of the static form field (e.g., horizontal lines, vertical lines, text, radio buttons, check boxes, signature fields, or any combination of these). An attribute of the fillable form field candidate can be identified based on the static text representing the label corresponding to the field. For example, if the form includes the text "City" next to a blank line, the fillable form field candidate may include the region above the blank line, and an attribute of the fillable form field candidate may be a label called "city." Next, a suggested response for populating the fillable form field candidate is selected from among a plurality of prior responses to other form fields having at least one attribute in common with the identified attribute of the fillable form field candidate or having some user-specific information related to a context associated with the identified attribute. The prior responses are inputs obtained from or otherwise associated with the given user, so that the suggested response is unique to that user. For instance, if the user previously entered "Greenwich" in the "city" field of another form, the suggested response for filling the current form field labeled "city" may be "Greenwich" when the same user is working with the form. The suggested response is presented, via a graphical user interface, to the user for subsequent acceptance or rejection by the user. Continuing the above example, the suggested response, "Greenwich," is displayed in the region of the form containing the fillable form field candidate (e.g., the area above the black line next to the text "City"). A user may then select the suggested response upon clicking within the area of the form that represents the fillable form field candidate. In some cases, a list of several alternative suggested responses can be displayed in ranked order, and the user may then select from one of those alternative responses or manually enter or change the form field data upon clicking on the desired alternate fill-in value. Additionally or alternatively, keystrokes such as Up/Down arrow and Enter can be used to select one of the suggested responses. In some cases, techniques in accordance with various embodiments can allow a user to completely fill out a form using keystrokes coupled with tabbing through the field candidates without using a mouse, which facilitates maximum productivity. In this manner, minimal user intervention can be achieved when filling in flat forms, which improves productivity for all users, as well as accessibility for visually impaired users. In some embodiments, machine learning techniques (including neural networks) can be used to learn what data corresponds to which fields or types of fields for making suggestions.

Figure 1:
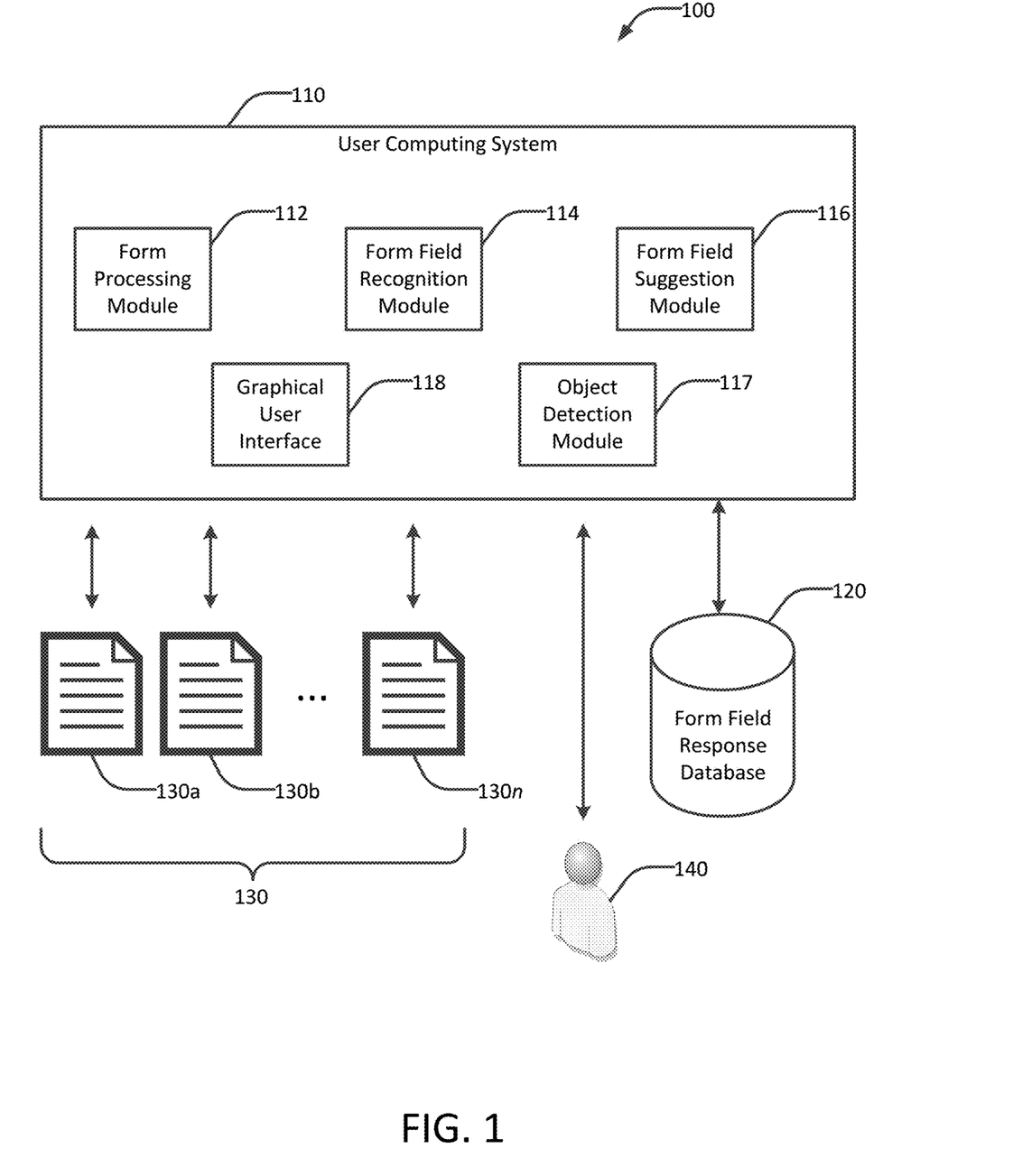
FIG. 1 shows an example system for recognizing form fields in an electronic form and automatically populating the form fields with data, in accordance with an embodiment of the present invention.

FIG. 1 shows an example system 100 for recognizing form fields in an electronic form and automatically populating the form fields with data, in accordance with an embodiment. The system 100 includes a user computing system 110 and a form field response database 120. The user computing system 110 includes a form processing module 112, a form field recognition module 114, a form field suggestion module 116 and an object detection module 117. The user computing system 110 interacts with one or more electronic forms 130 (indicated at 130a, 130b, . . . , 130n). The electronic forms 130 may, for example, include flat forms having only static form fields, or forms having one or more live form fields and one or more static form fields.

As described in further detail with respect to FIGS. 2 through 6, the form processing module 112 is configured to display, to a user 140 generally via a graphical user interface 118, the electronic forms 130, fillable form field candidates in the electronic forms 130, and suggested responses for filling the fillable form field candidates. The form processing module 112 is further configured to receive input from the user 140 for selecting fillable form field candidates, selecting suggested responses for filling the fillable form field candidates, entering data into the fillable form field candidates, or any combination of these. The form field recognition module 114 is configured to identify the fillable form field candidates in the electronic forms 130 using image recognition and text processing techniques. The form field suggestion module 116 is configured to store, in the form field response database 120, prior responses by the user 140 to form fields in the electronic forms 130. The form field suggestion module 116 is further configured to provide suggested responses to the user 140 for filling in one or more of the fillable form field candidates based on the prior responses stored in the form field response database 120. The object detection module 118 is configured to perform optical character recognition (OCR), graphic object detection, or both on an image-based electronic form 130 or document. OCR can be used for converting an image into text, and graphic object detection can be used for detecting lines or other graphic elements.

Figure 2:
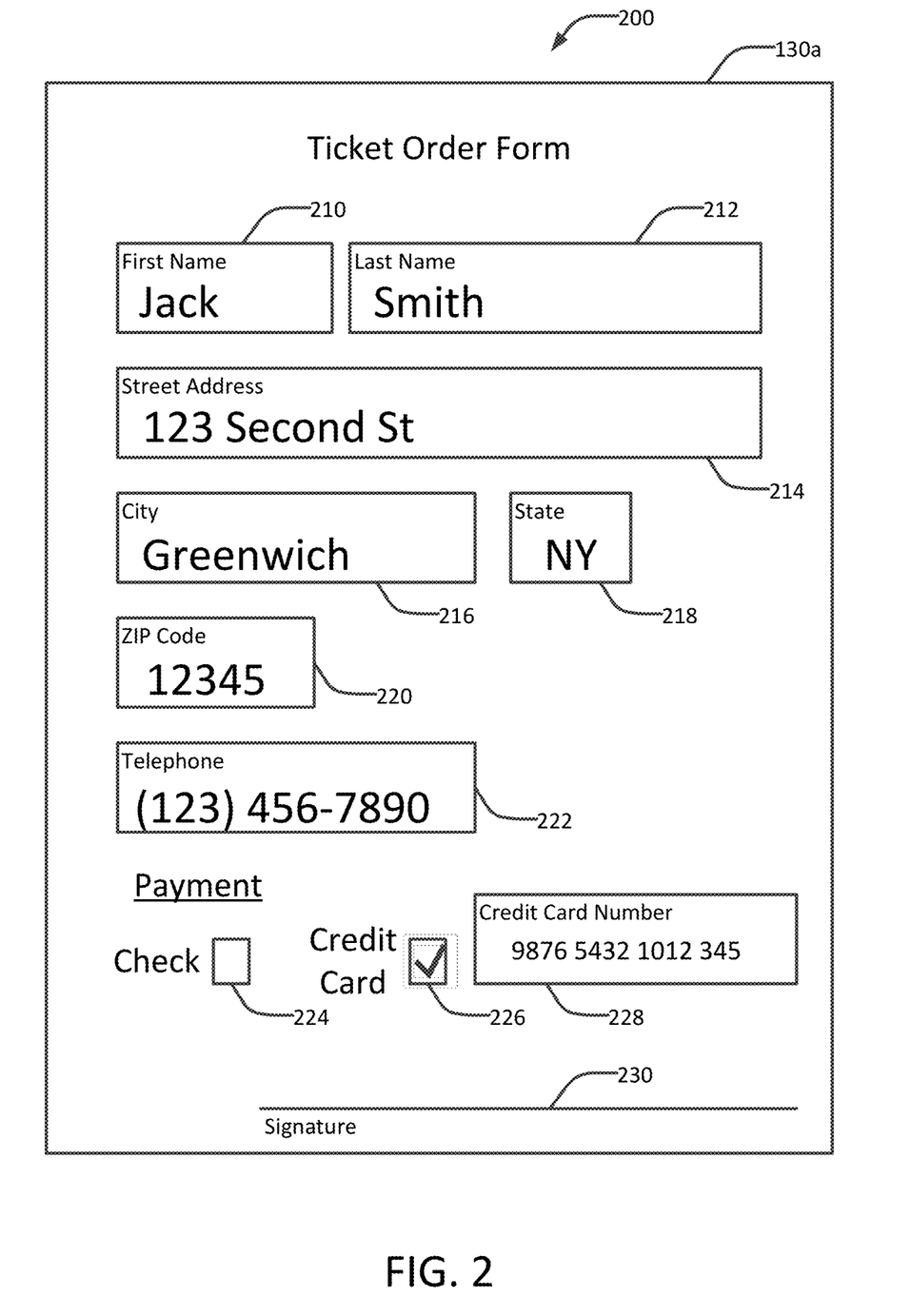
FIGS. 2 and 3 are screenshots of an example electronic form as it appears in a graphical user interface, in accordance with an embodiment of the present invention.
Figure 3:
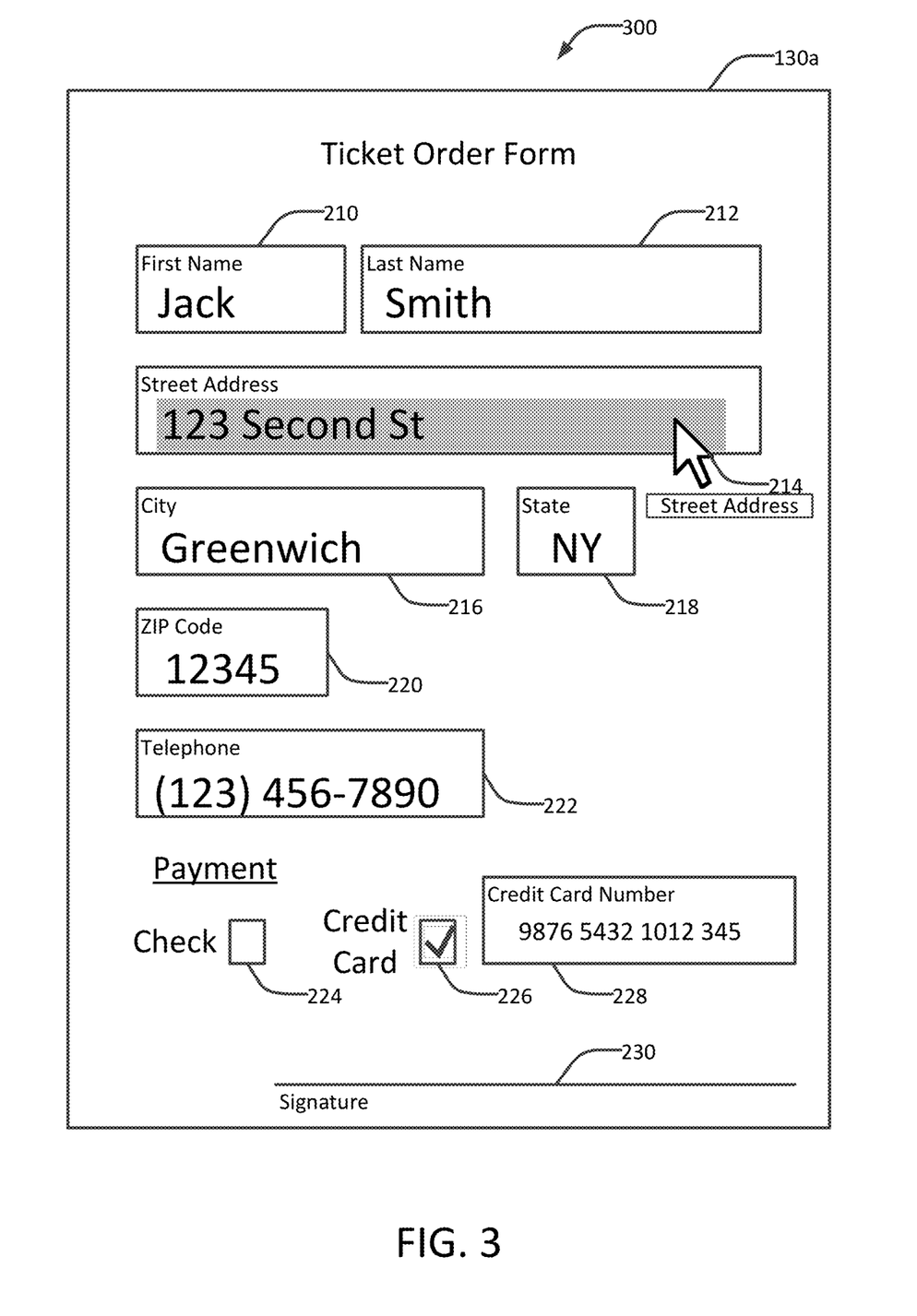

FIGS. 2 and 3 show screenshots 200, 300 of an example electronic form 130a as it appears in a graphical user interface (GUI), in accordance with an embodiment. The form 130a may, for example, be a flat form having no live form fields. The form 130a includes several static form fields, such as fields for first name 210, last name 212, street address 214, city 216, state 218, ZIP code 220, telephone 222, payment information 224, 226 and 228, and signature 230. In FIG. 2, the fields of the form 130a are shown filled with user provided data; however, it will be understood that these fields may initially be blank. Each static form field has one or more attributes associated with it, such as boxes or lines that delineate the form field, as well as text corresponding to the static form field (e.g., text adjacent to the field that indicates the content of the field, or other labels or metadata associated with the field). Such text can be associated with the field as a label. For example, the box containing the text "Street Address" likely indicates that the box is a form field for entering a user's street address and is given a label such as "address," "street" or "street address." Dictionary definitions may be used in some cases to generate labels having terms or words that are similar (e.g., "road," "highway," "route," etc.). In some embodiments, machine learning can be used to perform semantic reasoning for distinguishing multiple contexts of a given word or set of words, as well as finding similar terms. For example, if a field label is "address" instead of "street address, "address" might mean "street address", but it might also mean "email address", which is a completely different meaning. Machine learning techniques can use words near this field to improve selection of the appropriate meaning. For example, "city" and "state" near one another may suggest that "address" more likely means "street address" than "email address."

Initially, form field recognition is performed on the static fields of the form 130a using, for example, text, vertical lines, horizontal lines, boxes and circles as inputs to a form field recognition algorithm. In some embodiments, a field can be represented by groups of text. For example, the form may include a line of text reading "Circle the one that applies." Below that text are four groups of words, such as "High School", "College", "Masters", and "Doctorate"), where each group of words is a fillable form field candidate that can be selected or unselected. The inputs may, for example, come from a document (e.g., PDF) content stream, or from optical character recognition (OCR) pre-processing performed on an image of the form 130a. Such pre-processing may, for example, be performed by the object detection module 117. The form field recognition algorithm outputs one or more fillable form field candidates corresponding to the static fields of the form 130a. The screenshot 300 of FIG. 3 shows the street address field 214 highlighted when a mouse pointer is placed in the region of the fillable form field candidate to indicate that the underlying static field is fillable. Each fillable form field candidate has one or more attributes, such as a location within the form 130a (e.g., an (x, y) reference frame), field type (text, radio button, check box, signature), label (e.g., "Street Address"), and parent labels (for, e.g., radio buttons and check boxes). Other hierarchical data structures can be used, such as where there are multiple address fields for billing and shipping. Although each field may have a similar attribute (e.g., address), those attributes can be categorized according to the hierarchical structure (e.g., billing address and shipping address). Once the fillable form field candidates are identified, the user can input data values into blank form fields with no guidance from the application (e.g., no suggested responses). This may be necessary, for instance, if the user has not provided any prior responses that correspond with the fillable form field candidates. The input data values are then stored in a database as label-value pairs that are associated with the user. In some cases, the field type can be used to automatically select a user interface tool for entering data. For example, a cursor tool for a text field, a checkmark tool for a checkbox field, and a pen tool for a signature field.

Next, one or more suggested responses for filling the form field candidates are generated using the labels coupled with prior responses. The prior responses are obtained from other forms that have been filled out in the same manner by the same user and stored in a database, such as described with respect to FIG. 4. The suggested responses may include values defined by any interaction by the user, such as hypothesized data, user entered data, corrected data, and alternate values previously selected by the user. For example, the suggested response may include text for a text form field, or a selected or unselected value for a checkbox or radio button field. In some embodiments, some or all of the prior responses whose words (or dictionary equivalents) in each label corresponding to the prior response are in common with the words in the fillable form field candidate can be taken into account using existing form filling prediction techniques.

Figure 4:
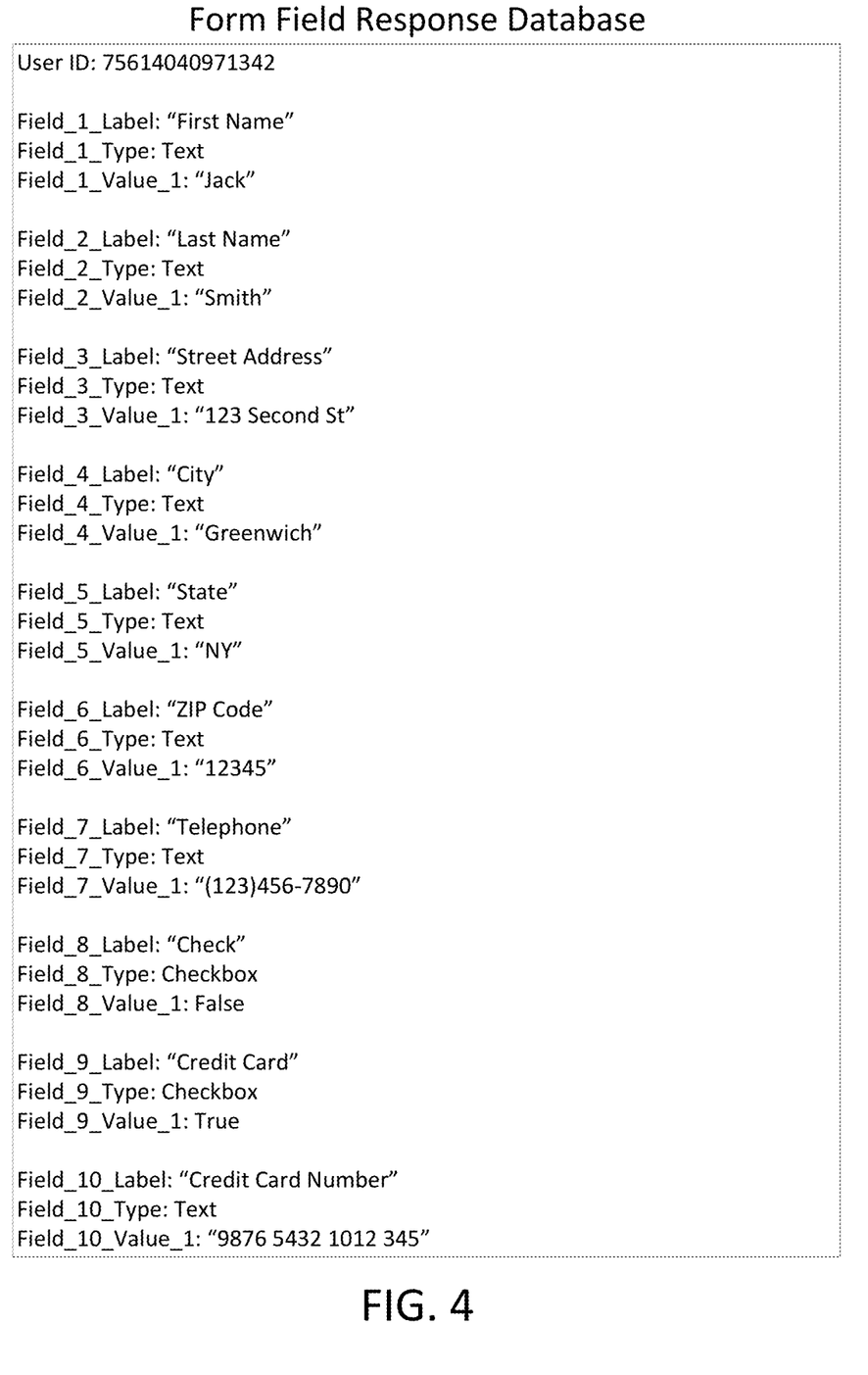
FIG. 4 is an example of a portion of a form field response database, in accordance with an embodiment of the present invention.

FIG. 4 is an example of a portion of a form field response database (e.g., the form field response database 120 of FIG. 1), in accordance with an embodiment. The database is configured to store form field response data representing one or more prior user responses to fillable form fields in a form (e.g., any of the static fields 210-230 of FIG. 2). The form field response data may include, for example, a user identification number that is used to associate some or all of the form field response data with a particular user, such that different sets of form field response data can be used for different users. For example, first name depends on the context of the person being referring to. One way to identify the person is through the use of a user ID of some form. The user ID may, for example, be defined as a string to allow for maximum flexibility, but could also correspond to a numerical identifier, such as depicted in FIG. 4. When possible, each user can be assigned a user ID based on some other existing information, such as an Acrobat.com user account identifier. Other users may, for example, be referenced by a unique user ID taken from a profiles index that ties a user's information to a set of profiles (e.g., self, significant other, children, parents). When filling out a form, the context of the user acting within the form can be defined for either the entire form or a specific section within that document.

For each of the fillable form field candidates, the form field response data may further include, for example, one or more data records each having a label, a field type, a value, and other information. In this case, each data record includes a label-value pair, where the label associates the value with the respective fillable form field candidate. Although not shown in FIG. 4, each label can be paired with several values that correspond to the label. For instance, if a given form field is associated with two different values, both of those values can be stored in separate or combined data records. It will be understood that, in some cases, some or all of the form field response data can be encrypted using, for example, a one-way hash or other suitable data encryption technique. Additionally or alternatively, the form field response data can be stored as an array or token-separated string comprised of hashes for each word value (e.g., first name, last name, etc.).

In some embodiments, each data record can represent a neuron (or cellular automata) in a neural network. The neuron contains specific information (e.g., context, type, label, value) while the strength of this neuron is based on historical accumulation of this information (e.g., confidence, weight, recency, time) with the remaining factors (e.g., action, source, convert) corresponding to the corrective feedback sent to each existing neuron (e.g., rules and/or weights applied to those rules in adjusting the strength of each neuron). Note that the data used for this corrective feedback (e.g., action, source, convert) may be stored for supervised training purposes, but may also be used for decision making itself (e.g., a label from OCR conversion may require loose matching due to the potential for bad OCR results).

In some embodiments, the data records represent a weighted average of prior responses, using a time field for creation and last revision time, and a recency factor describing how recently the data was input by the user. For example, the storage time may be used to account for a recency factor corresponding to "right now"; any modification of the data record would then use this new "right now" recency factor along with the current time. Placing each record of the form field response database in a collective form using weighted averages can both cut down on storage space as well as aid in reducing the complexity of calculations that utilize the data. In some embodiments, some data records can be culled when the confidence or recency factor drops below a specified cutoff, making the record effectively no longer relevant for further use. In some embodiments, a synapse represents a collection of data records (e.g., a set of neurons). Each synapse effectively represents an action taken by the user to add, remove or alter the value corresponding to a given label. The confidence includes the confidence in the label as well as the confidence in the value for cases where the value was synthesized.

In neural networks, the learning rate is a parameter that determines how much an updating step influences the current value of the weights, while weight decay is an additional term in the weight update rule that causes the weights to exponentially decay to zero, if no other update is scheduled. For example, if there is a cost or error function $E(w)$ that is to be minimized, a gradient descent will modify the weights w in the direction of steepest descent in E: $w(i+1) = w(i) - \eta \partial E / \partial w(i)$, where $\eta$ is the learning rate. To effectively allow for enhanced learning of new patterns, according to an embodiment, the cost function can include an additional term that penalizes based on weight: $\lambda\ w(i)^2$. Applying gradient descent to this new cost function E results in: $w(i+1) = w(i) - \eta \partial E / \partial w(i) - \eta \lambda\ w(i)$, which causes the weight to decay in proportion to its size. To simulate such a phenomenon in the response data, it may be preferable to not have to necessarily update all nodes every time a single action is performed on the form. By saving a recency factor, older node values (e.g., where the update time is fairly old or the recency factor is low) and the weights of those values can be balanced out with more recent actions to avoid using outdated information (e.g., when someone begins to consistently use a new mailing address after having used an older address for many prior forms). Since not all data records are necessarily referenced with each action (e.g., only a sparse portion of the neural network may be accessed each time an update occurs), the data records are assigned a relevancy factor with respect to both weight and recency. Unlike a human brain whose neurons grow stale with time if they are not used (i.e., consistent weight decay), in some embodiments, the weight of prior response data will not decay unless some user action prompts an actual access and modification of the data record, thereby causing the record to effectively strengthen or weaken.

Subsequently, the form fields are populated with suggested response data values derived from prior user responses to the same or similar form fields. If more than one suggested response is available for a given fillable form field candidate, the highest ranked suggested response may be used, or several alternative suggested responses may be presented in a list for the user to select from. In some cases, the application provides navigation guidance within the form 130a via tabbing (e.g., when the user presses the Tab key, the application provides a suggested response to the next fillable form field candidate). In some embodiments, the user can use the tab key or other keyboard input to sequentially select the fillable form field candidates in a logical order as defined in a hierarchy of the information on a page. For example, the hierarchy may be established using a table with several fill-in values in a column of a document. The table itself may contain individual fields before or after the columns, or before or after the table in the column. When the user tabs to the next fillable form field candidate, the user can then accept the suggested response for that field or manually type other data into the field.

Both the initial learning stage and subsequent response suggestion stages rely on a model for representing a mapping between a fillable form field candidate and a suggested response. To accomplish this, in an embodiment, a structure is generated that represents a decision that was made correlating a form field candidate label and the value associated with that field. For instance, a new synapse record can be created for each form or document. This synapse record is processed using a one-time prediction of label values by retrieving all synapse records into a flat synapse array with all pertinent data. Next, a text label value or button group label is predicted by exhaustively searching the entire synapse array looking for label overlap/commonality and adding candidates to form a prediction array. Next, new form field elements and user value elements are stored in the form and user databases, respectively. A new synapse record is created when the data or user database records change for a given form.

According to another embodiment, a different technique can be utilized. Using this technique, a list of synapse records is created on a per user basis, with each record including several forms. In this manner, it does not matter which form a label-value pair came from so long as all pairs can be referenced if that form is removed from the database. One or more follow up actions can be appended to a single record so long as there is a cross-reference between the form and that record. Thus, all synapses from a particular form can be located in a single record, although it will be understood that multiple forms can also be referenced within a record. The order of processing and building several key lookup tables on the fly to improve efficiency can be performed as follows. First, a single list of labels and choices (e.g., for button groups) is built. Next, that list of labels is filtered into a list of words, with the words coming from the words in the label. Synapse records are loaded when the words in the corresponding label overlap or are otherwise in common with the field candidate label list of words. Next, a dictionary of words as keys and synapse-list values is built to allow quick parsing of synapses based on words. Next, all matching words in the labels are located by following the synapse-list values. As the words are processed, synapses that have already been processed are tracked via a list of referenced synapses. New synapse records can be created by adding the form to a processing queue whenever values on the form are changed and evaluated upon either leaving the form or upon the next user login/startup. In this manner, label-value pairs can be directly passed from the form filling application (e.g., the form processing module 112 of FIG. 1), which knows the label, without requiring any analysis of the initial field recognition table data and form/user data to find overlapping/common fields and values.

Figure 5:
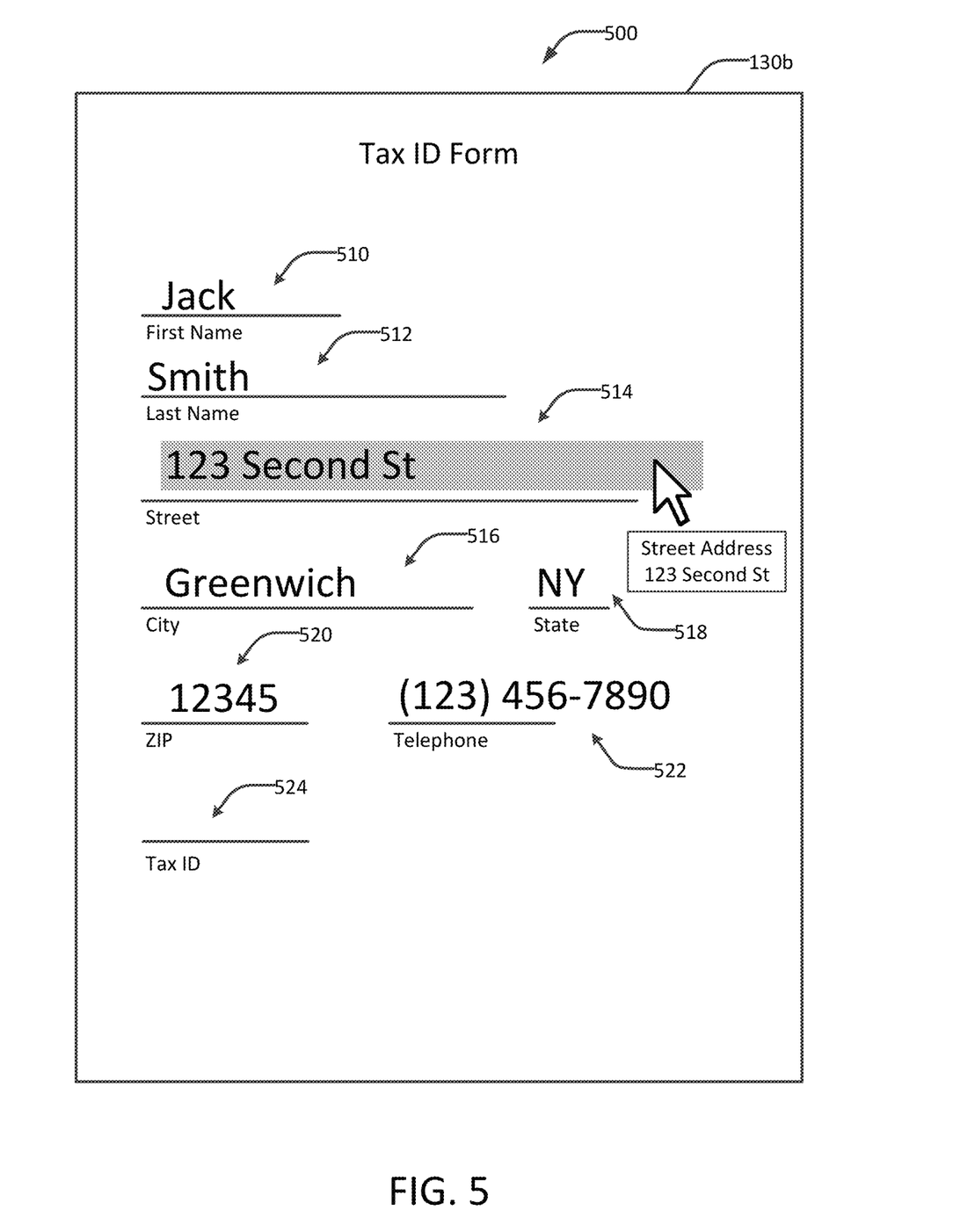
FIGS. 5 and 6 are screenshots of another example electronic form as it appears in a graphical user interface, in accordance with an embodiment of the present invention.
Figure 6:
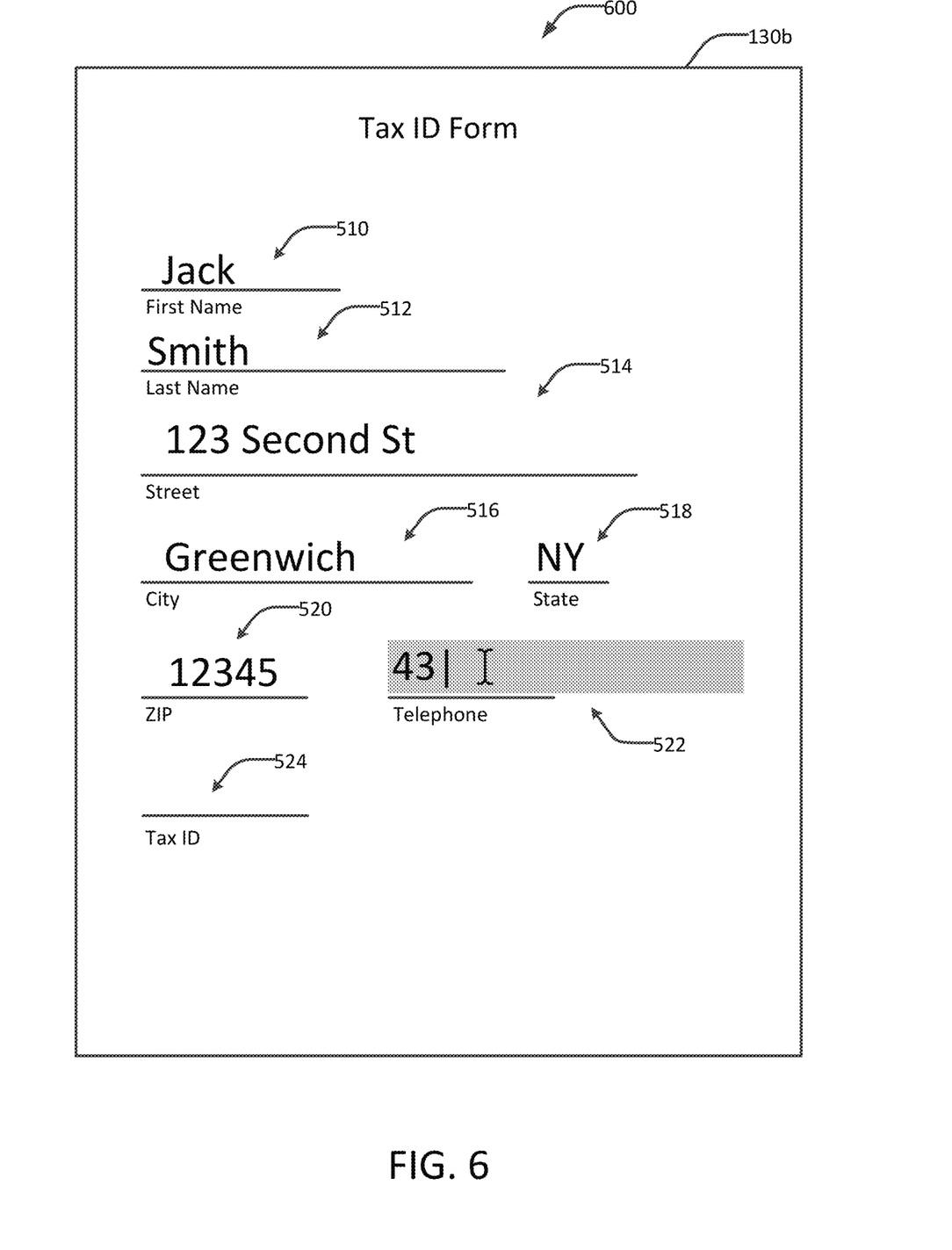

FIGS. 5 and 6 are screenshots 500, 600 of another example electronic form 130b as it appears in a graphical user interface (GUI), in accordance with an embodiment. As with the form of FIG. 2, the form 130b may, for example, be a flat form having no live form fields. The form 130b includes several static form fields, such as fields for first name 510, last name 512, street 514, city 516, state 518, ZIP code 520, telephone 522, and tax ID 524. As can be seen in comparison to the form 130a of FIG. 2, some but not of the static form fields of the form 130b are similar. For example, both forms 130a and 130b include a field for street address, but form 130b includes a field for tax ID that does not appear in form 130a. As with form 130a, each static form field in form 130b has one or more attributes associated with it, such as boxes or lines that delineate the form field, as well as text adjacent to the static form field. Such text can be associated with the field as a label. For example, the box containing the text "Street" likely indicates that the box is a form field for entering a user's street address, even though the word "address" is not on the form. However, because the word "Street" is adjacent to the static field, any values associated with labels in the database that include the word "street" are potentially suitable for use as recommended responses. In FIG. 5, some of the fillable form field candidates (e.g., first name 510, last name 512, street 514, city 516, state 518, ZIP 520 and telephone 522) are automatically populated with suggested responses (e.g., the same corresponding values that the user previously provided when filling in the form 130a of FIG. 2). Some other fields in the form 130b are blank (e.g., tax ID 524) because there are no prior responses in the database that match the label of the field.

In some embodiments, if the user accepts any or all of the suggested responses for filling the form 130b, such as shown in FIG. 5, those suggested responses can be automatically entered into the corresponding fillable form field candidates. However, the user may choose to reject any or all of the suggested responses. For example, as shown in the screenshot 600 of FIG. 6, the user is typing a different number into the telephone form field, which overrides the suggested response for that field shown in the screenshot 500 of FIG. 5. The user entered value can then be stored instead of the suggested response.

Example Methodology

Figure 7:
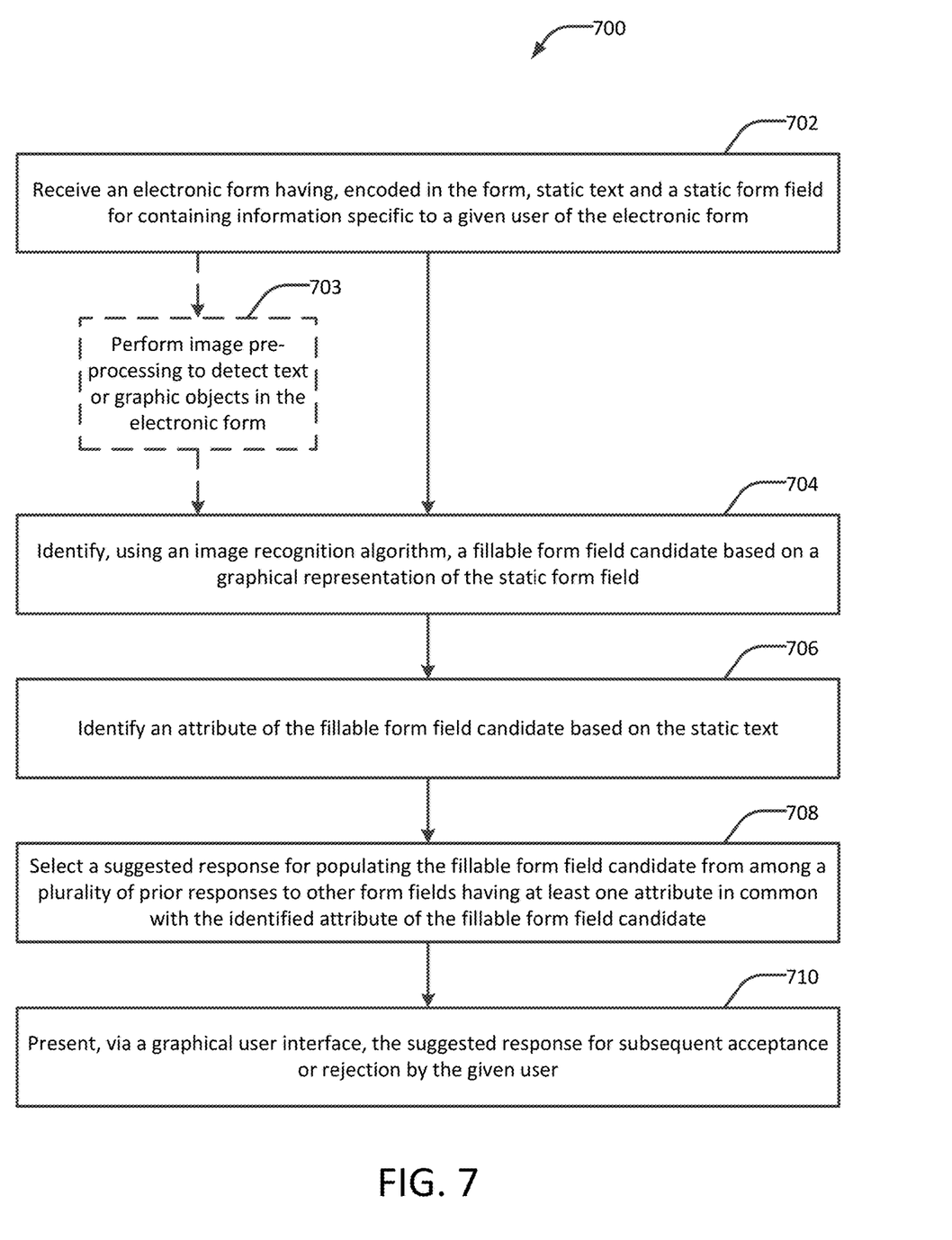
FIG. 7 is a flow diagram of an example methodology for recognizing form fields in an electronic form and presenting relevant data suggestions, in accordance with an embodiment of the present invention.

FIG. 7 is a flow diagram of an example methodology 700 for recognizing form fields in an electronic form and presenting relevant data suggestions, including the option to automatically populate the form fields with data, in accordance with an embodiment. The method 700 may be performed, for example, in whole or in part by the form processing module 112, the form field recognition module 114, the form field suggestion module 116, the graphical user interface 118, or any combination of these, such as described with respect to FIG. 1. The method 700 begins by receiving 702 an electronic form having, encoded in the form, static text and a static form field for containing information specific to a given user of the electronic form. In some embodiments, the electronic form is encoded according to a Portable Document Format (PDF) specification. In some other embodiments, the electronic form is encoded using Extensible Markup Language (XML). It will be understood that any rendered format can be used, including but not limited to PDF and XML. In cases where the electronic form is in an image-only format or includes no text or separable rendered graphics, the method 700 includes a pre-processing step 703 for detecting text and graphic objects in the electronic form. The method continues by identifying 704, using an image recognition algorithm, a fillable form field candidate based on a graphical representation of the static form field. In some embodiments, the graphical representation includes a horizontal line, a vertical line, a box, a circle, white space, patterns of text or symbols, underlining, a fillable/markable shape (e.g., a hollow square or diamond), or semantic context. Examples of semantic context include: "Circle one: M F", "Usefulness: 1 2 3 4 5", and "Underline the best response . . . ". The method continues by identifying 706 an attribute of the fillable form field candidate based on the static text. The method continues by selecting 708 a suggested response for populating the fillable form field candidate from among a plurality of prior responses to other form fields having at least one attribute in common with the identified attribute of the fillable form field candidate or having some user-specific information related to the identified attribute based on context, the prior responses or user-specific information having been obtained from the given user. For example, a user fills in a form with three items on a line, labeled "First Name", "Middle Initial", and "Last Name". Then the user fills in a form with three items on a line, labeled "First", "MI", and "Last". The middle of the three items in the second form has no words in common with the middle of the three items in the first, but it is positionally related to two other fields that do have corresponding words. That positional information may be used to deduce that the middle item of the second form ("MI") may be related to the middle item in the first form ("Middle Initial"). In this example, there are no words that overlap—the attribute is a positional, not a textual one. In some embodiments, the suggested response is selected using a machine learning system or a neural network. The method continues by presenting 710, via a graphical user interface, the suggested response for subsequent acceptance or rejection by the given user.

In some embodiments, the suggested response is selected and presented to the user without a user input that selects any region of the electronic form (e.g., a mouse click on a fillable form field candidate or a keyboard input, such as a tab key input). For example, the suggested response may be automatically filled into the fillable form field candidate when the form is opened and before the user clicks on any of the fillable form field candidates. In this manner, the user need only confirm that the suggested response is acceptable by submitting the form for processing, minimizing the amount of user intervention needed to fill in the form.

In some embodiments, the method 700 includes identifying, using content encoded in the electronic form, optical character recognition of the electronic form, or both, a location of the fillable form field candidate within the electronic form (e.g., an (x, y) coordinate), and a type of the fillable form field candidate. The type may include, for example, a text field, a signature block, a radio button, and a check box, or any other suitable type of form field.

In some embodiments, the suggested response corresponds to the identified type of the fillable form field candidate. For example, if the fillable form field candidate is a text type, then the suggested response may include text (e.g., letters, numbers, symbols). If the fillable form field candidate is a checkbox or radio button type, then the suggested response may include a checked box/selected radio button or an unchecked box/unselected radio button. If the fillable form field candidate is a signature type, then the suggested response may include a graphical representation of a handwritten signature. These are only a few examples, and others will be apparent in light of this disclosure.

In some embodiments, the method 700 includes presenting, via the graphical user interface and in response to receiving a user input rejecting the suggested response, at least one alternative suggested response from among the plurality of prior user responses. For instance, if the database includes multiple prior responses that are weighted according to recency, the alternative suggested response may be a less recent prior response than the initially suggested response. For example, if there are two different street addresses in the database, the suggested response may be the most recently entered address, and the alternative suggested response may be an older address.

In some embodiments, the method 700 includes generating a word-based label that describes an attribute of the fillable form field candidate. The selecting of the suggested response may include, for example, matching at least a portion of the word-based label to another word-based label associated with the other form fields. For example, if a fillable form field candidate is associated with a label "street address," the suggested response may be selected from among all records in the database associated with a label of "street," "address" or "street address."

In some embodiments, the method 700 includes calculating a weight or confidence associated with each of the prior responses. The suggested response is selected based on the weight or confidence. The weight or confidence may be calculated, for example, based on how recently the prior response was entered by a user or how many times a particular suggested response was accepted by a user. In some embodiments, prior responses that are more recent or more frequently accepted than others can be given a greater weight or confidence. The weight or confidence can be used to select a suggested response from among some or all of the prior responses. For example, the suggested response may be the prior response having the greatest weight or confidence.

Example Computing Device

Figure 8:
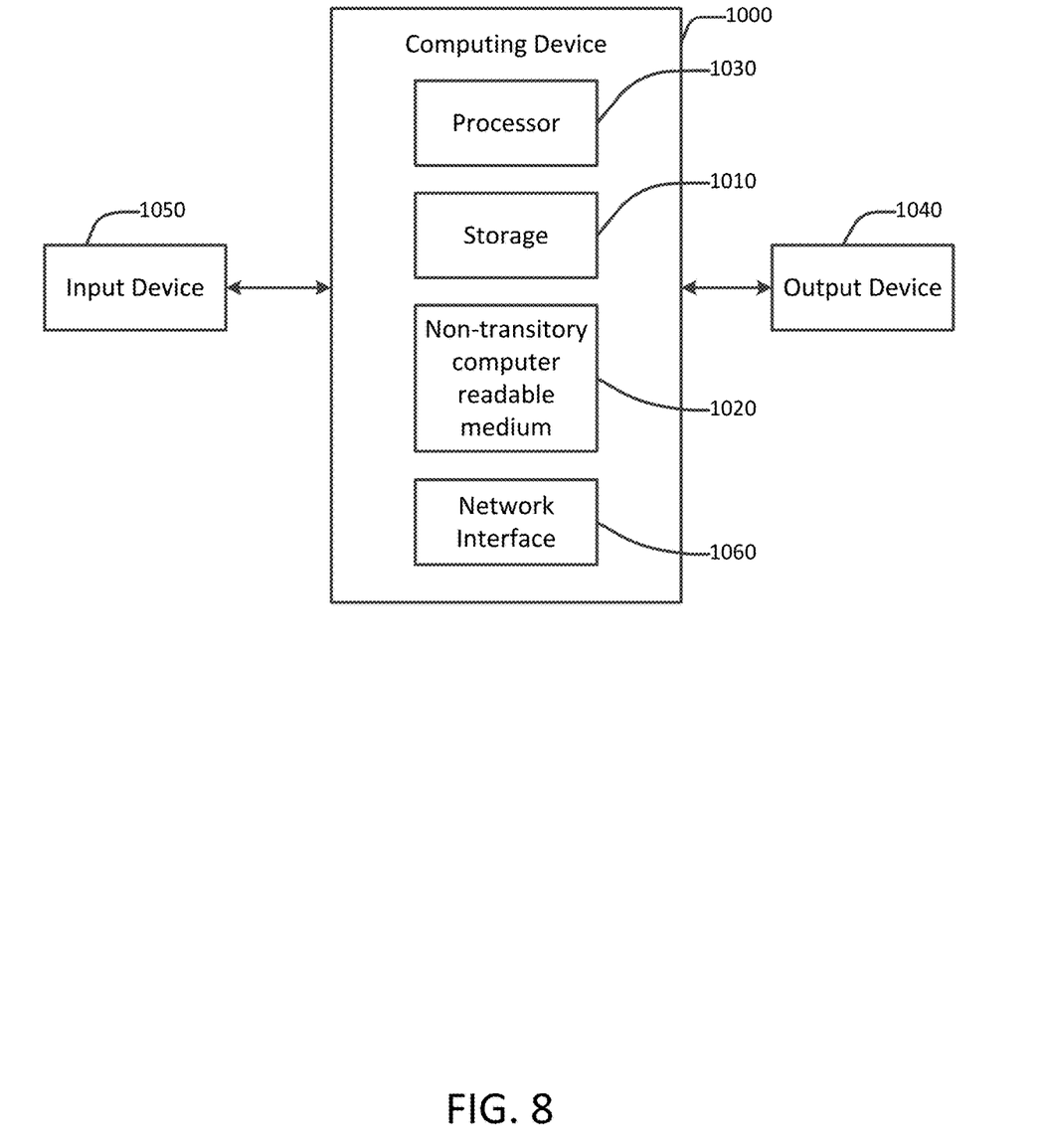
FIG. 8 is a block diagram representing an example computing device that may be used in accordance with an embodiment of the present invention.

FIG. 8 is a block diagram representing an example computing device 1000 that may be used to perform any of the techniques as variously described in this disclosure. For example, the user computing system, the desktop publishing application, the document conversion module, the document viewer, or any combination of these may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display one or more user interfaces provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the form processing module 112, the form field recognition module 114, the form field suggestion module 116, the graphical user interface 118, or any combination of these, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a system including a storage having at least one memory, and one or more processors each operatively coupled to the storage. The one or more processors are configured to carry out a process including receiving an electronic form having, encoded in the form, static text and a static form field for containing information specific to a given user of the electronic form; identifying, using an image recognition algorithm, a fillable form field candidate based on a graphical representation of the static form field; identifying an attribute of the fillable form field candidate based on the static text; selecting a suggested response from a ranked set of suggested responses for populating the fillable form field candidate, the ranked set of suggested responses including user-specific information obtained from the given user and based on at least one of: a plurality of prior responses to other form fields having at least one attribute in common with the identified attribute of the fillable form field candidate, and a context associated with the identified attribute; and presenting, via a graphical user interface, the suggested response for subsequent acceptance or rejection by the given user. In some cases, the suggested response is selected and presented to the user without a user input that selects any region of the electronic form. In some cases, the process includes identifying, using at least one of content encoded in the electronic form and optical character recognition of the electronic form: a location of the fillable form field candidate within the electronic form; and a type of the fillable form field candidate, the type including one of a text field, a signature block, a radio button, and a check box, where the suggested response corresponds to the identified type of the fillable form field candidate. In some cases, the process includes presenting, via the graphical user interface and in response to receiving a user input rejecting the suggested response, at least one alternative suggested response from among the ranked set of suggested responses. In some cases, the process includes generating a word-based label that describes an attribute of the fillable form field candidate, where the selecting of the suggested response includes matching at least a portion of the word-based label to another word-based label associated with the other form fields. In some cases, the process includes calculating a weight associated with each response in the ranked set of suggested responses, where the suggested response is selected based on the weight. In some cases, the suggested response is selected using a machine learning system or neural network. In some cases, the graphical representation includes at least one of a horizontal line, a vertical line, a box, a circle, groups of text, white space, a pattern of text or symbols, underlining, a fillable/markable shape, and semantic context. In some cases, the electronic form is encoded according to a rendered format defining rendered text and graphic objects. In some cases, the electronic form is encoded using an image file representation of the electronic form that can be processed via at least one of optical character recognition and graphic object detection. In some cases, the user-specific information includes at least one of: a plurality of prior responses to other form fields by the given user, and contextual user information associated with the given user. Another embodiment provides a non-transient computer-readable medium or computer program product having instructions encoded thereon that when executed by one or more processors cause the processor to perform one or more of the functions defined in the present disclosure, such as the methodologies variously described in this paragraph. In some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. In a digital medium environment for processing electronic forms, a computer-implemented method for identifying fillable form field candidates and populating fillable form field candidates using prior responses to similar form fields or other user-specific information, the method comprising:
    receiving an electronic form having, encoded in the form, static text and a static form field for containing information specific to a given user of the electronic form;
    identifying, using an image recognition algorithm, a fillable form field candidate that corresponds to the static form field, wherein the identifying is based on a meaning of the static text corresponding to the static form field;
    identifying an attribute of the fillable form field candidate based on the static text;
    selecting a suggested response for populating the fillable form field candidate from among a plurality of prior responses to other form fields having at least one attribute in common with the identified attribute of the fillable form field candidate; and
    presenting, via a graphical user interface, the suggested response for subsequent acceptance or rejection by the given user.

2. The method of claim 1, wherein the suggested response is selected and presented to the user without a user input that selects any region of the electronic form.

3. The method of claim 1, further comprising identifying, using at least one of content encoded in the electronic form and optical character recognition of the electronic form:
    a type of the fillable form field candidate, the type including one of a text field, a signature block, a radio button, and a check box,
    wherein the suggested response corresponds to the identified type of the fillable form field candidate.

4. The method of claim 1, further comprising presenting, via the graphical user interface and in response to receiving a user input rejecting the suggested response, at least one alternative suggested response from among the plurality of prior responses.

5. The method of claim 1, further comprising generating a word-based label that describes the attribute of the fillable form field candidate, wherein the selecting of the suggested response includes matching at least a portion of the word-based label to another word-based label associated with the other form fields.

6. The method of claim 1, further comprising calculating a weight associated with each response of the plurality of prior responses, wherein the suggested response is selected based on the weight.

7. The method of claim 1, wherein the suggested response is selected using a machine learning system.

8. The method of claim 1, wherein the electronic form is encoded according to a rendered format defining rendered text and graphic objects.

9. The method of claim 1, wherein the electronic form is encoded using an image file representation of the electronic form that can be processed via at least one of optical character recognition and graphic object detection.

10. In a digital medium environment for processing electronic forms, a system for identifying fillable form field candidates and populating fillable form field candidates using prior responses to similar form fields, the system comprising:
    a storage; and
    a processor operatively coupled to the storage, the processor configured to execute instructions stored in the storage that when executed cause the processor to carry out a process comprising:
        receiving an electronic form having, encoded in the form, static text and a static form field for containing information specific to a given user of the electronic form;
        identifying a fillable form field candidate that corresponds to the static form field, wherein the identifying is based on a meaning of the static text corresponding to the static form field;
        identifying an attribute of the fillable form field candidate based on the static text;
        selecting a suggested response for populating the fillable form field candidate from among a plurality of prior responses to other form fields having at least one attribute in common with the identified attribute of the fillable form field candidate; and
        presenting the suggested response for subsequent acceptance or rejection by the given user.

11. The system of claim 10, wherein the suggested response is selected and presented to the user without a user input that selects any region of the electronic form.

12. The system of claim 10, wherein the process includes identifying, using content encoded in the electronic form:
    a type of the fillable form field candidate, the type including one of a text field, a signature block, a radio button, and a check box,
    wherein the suggested response corresponds to the identified type of the fillable form field candidate.

13. The system of claim 10, wherein the process includes presenting, in response to receiving a user input rejecting the suggested response, at least one alternative suggested response from among the plurality of prior responses.

14. The system of claim 10, wherein the process includes generating a word-based label that describes the attribute of the fillable form field candidate, wherein the selecting of the suggested response includes matching at least a portion of the word-based label to another word-based label associated with the other form fields.

15. The system of claim 10, wherein the process includes calculating a weight associated with each of the prior responses, wherein the suggested response is selected based on the weight.

16. A non-transient computer program product having instructions encoded thereon that when executed by one or more processors cause a process to be carried out, the process comprising:
    receiving an electronic form having, encoded in the form, static text and a static form field for containing information specific to a given user of the electronic form;
    identifying a fillable form field candidate that corresponds to the static form field, wherein the identifying is based on a meaning of the static text corresponding to the static form field;
    identifying an attribute of the fillable form field candidate based on the static text;
    selecting a suggested response for populating the fillable form field candidate from among a plurality of prior responses to other form fields having at least one attribute in common with the identified attribute of the fillable form field candidate; and presenting the suggested response for subsequent acceptance or rejection by the given user.

17. The computer program product of claim 16, wherein the suggested response is selected and presented to the user without a user input that selects any region of the electronic form.

18. The computer program product of claim 16, wherein the process includes calculating a weight associated with each of the prior responses, wherein the suggested response is selected based on the weight.

19. The computer program product of claim 16, wherein the process includes identifying, using optical character recognition of the electronic form:

a type of the fillable form field candidate, the type including one of a text field, a signature block, a radio button, and a check box, wherein the suggested response corresponds to the identified type of the fillable form field candidate.

20. The computer program product of claim 16, wherein the process includes presenting, in response to receiving a user input rejecting the suggested response, at least one alternative suggested response from among the plurality of prior responses.

* * * * *